Patented Feb. 14, 1928.

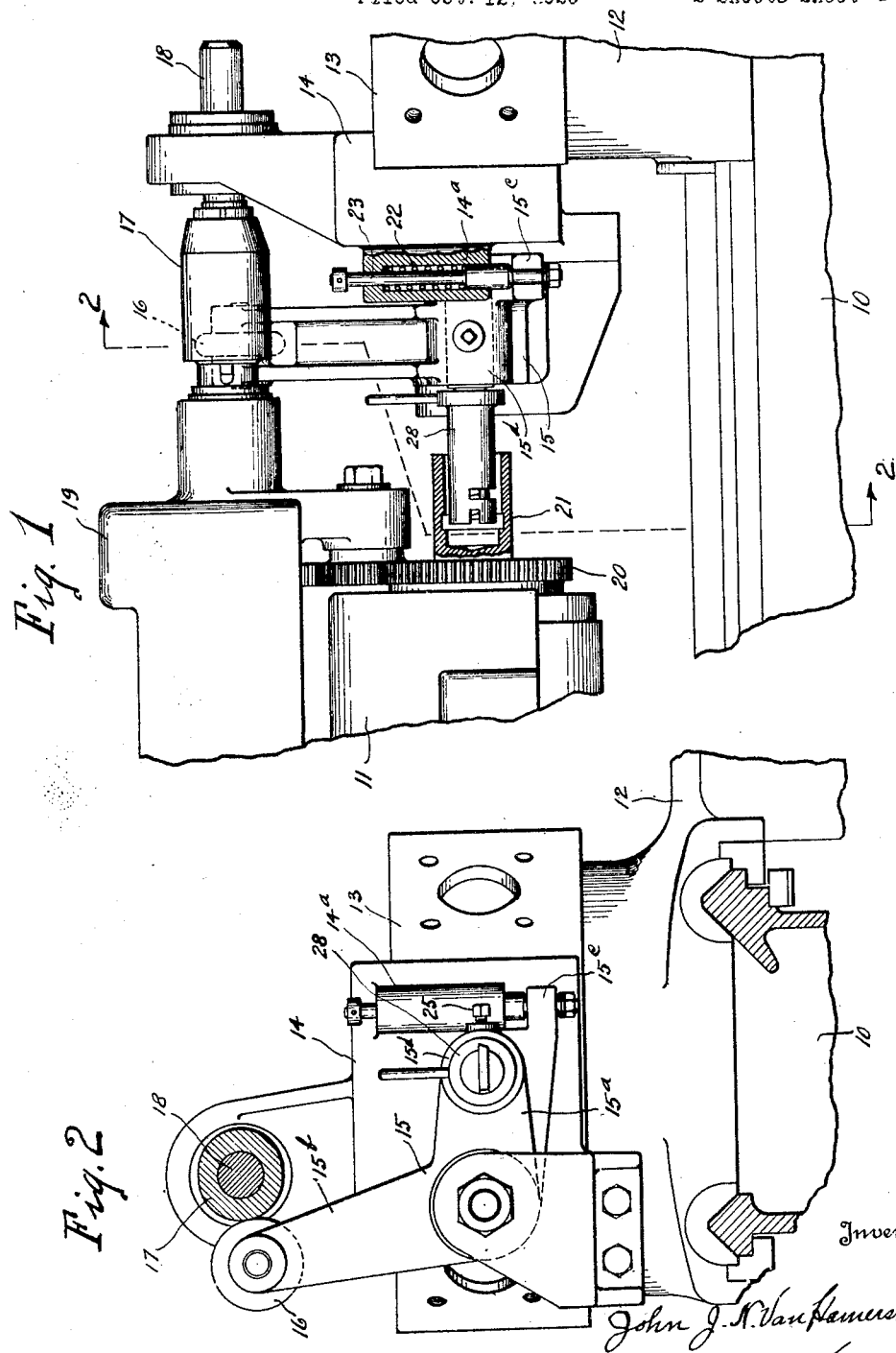

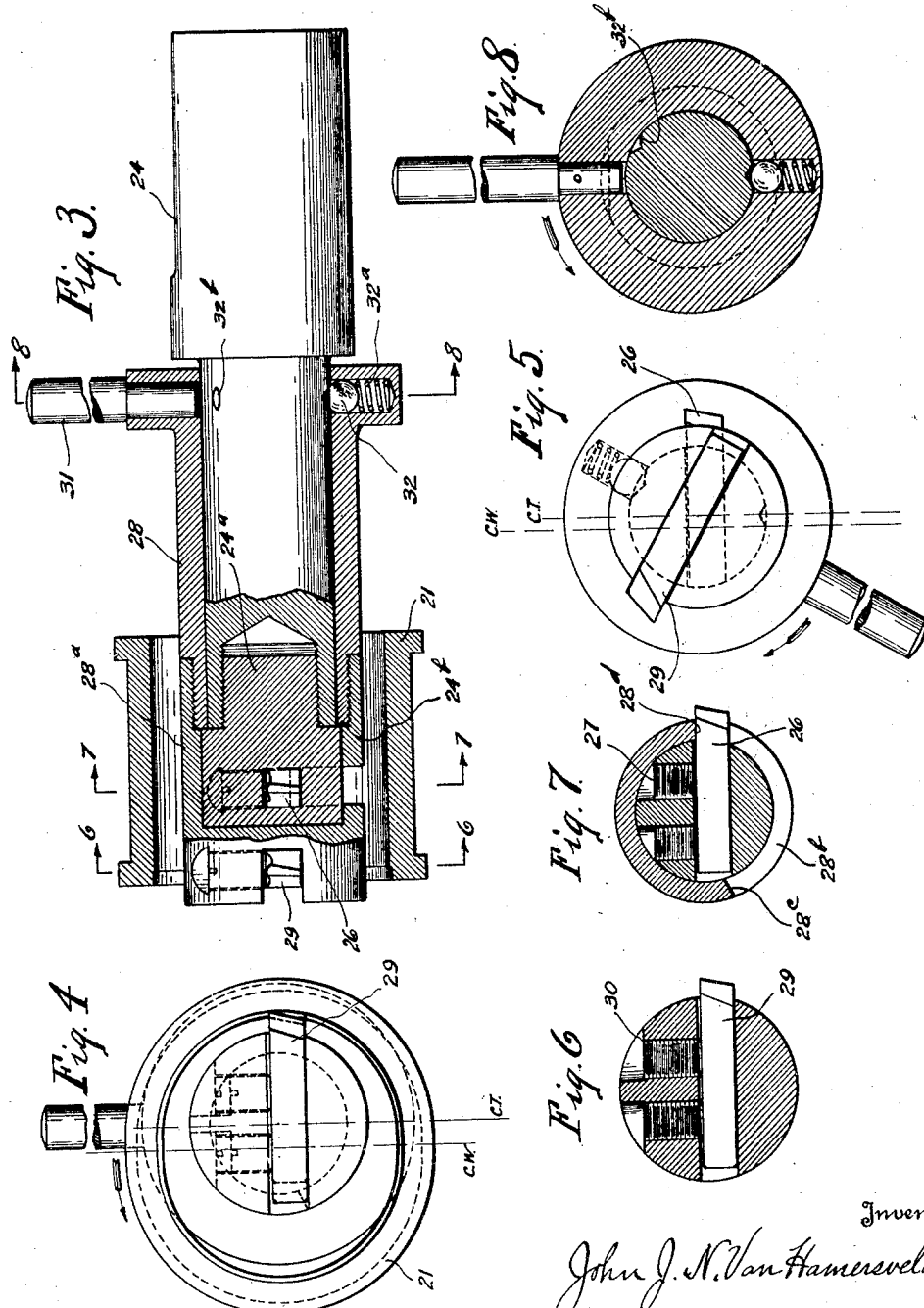

1,659,386

UNITED STATES PATENT OFFICE.

JOHN J. N. VAN HAMERSVELD, OF CLEVELAND HEIGHTS, OHIO, ASSIGNOR TO THE WARNER AND SWASEY COMPANY, OF CLEVELAND, OHIO, A CORPORATION OF OHIO.

TOOL HOLDER FOR MACHINE TOOLS.

Application filed October 12, 1925. Serial No. 61,892.

This invention relates to tool-holders for machine tools, and has for its chief object to provide a holder which accommodates a plurality of tools such as roughing and finishing tools adapted to be brought into cutting relation with the work successively.

Further the invention aims to do away with the necessity of having separate supports for the roughing and finishing tools, and to provide a unitary holder for both types of tools, the whole being so arranged that the roughing tool or tools can be caused to cut when the slide carrying the holder is moving in one direction with respect to the work and the finishing tool can be brought into cutting relation with the work and caused to make the finishing cut when the slide is moving in the opposite direction.

It is generally the case that when a machine, such as a turret lathe is equipped with roughing and finishing tools, the tools are supported on separate faces of the turret and are brought into cutting relation with the work by indexing the turret, the turret slide making a forward working stroke and an idle return stroke for each tool.

By the present invention the roughing and finishing tools are so arranged that when the invention is applied to a turret lathe there need be no indexing of the turret to bring the roughing and finishing tools into cutting relation with the work, and the return stroke of the slide is made a working stroke, the same as the forward stroke, thus effecting a considerable saving in time.

The invention may be briefly summarized as consisting in certain novel details of construction, and combinations and arrangements of parts which will be described in the specification and set forth in the appended claims.

Although my invention is not confined to any particular kind of machine tool, nor to a machine tool for operating on any particular kind of work, in Sheet 1 of the drawings I have illustrated my invention applied to a turret lathe provided with an attachment for boring or turning oval surfaces which may be straight or tapered axially considered, which attachment involves an oscillatory tool-carrying member. This attachment is fully described and claimed in a separate application, Serial No. 61,663, and the invention is illustrated in connection therewith, for the reason that it is particularly useful with an attachment of this kind, in view of the expense involved in providing separate oscillatory supports for the roughing and finishing tools.

Fig. 1 is a side view of a portion of the turret lathe equipped with my invention, certain parts being in section; Fig. 2 is a sectional view substantially along the line 2—2 of Fig. 1; Fig. 3 is a detached view of the tool-holder, shown partly in section and partly in elevation, and showing a portion of the workpiece; Fig. 4 is an end view of the same, this view showing the finishing tool in position for cutting; Fig. 5 is a similar view showing the roughing tool in position for cutting; and Figs. 6, 7 and 8 are sectional views substantially along the lines 6—6, 7—7 and 8—8 respectively, of Fig. 3, omitting the workpiece.

Referring now to the drawings, 10 is a portion of the bed of the lathe, 11 a portion of the head, and 12 a portion of the turret slide having the usual turret 13. Mounted on one face of the turret is a tool-holding bracket 14 which supports an oscillatory member 15, provided with an arm 15$^a$ which carries the present tool-holder, and a second arm 15$^b$, carrying a roller 16.

As the turret slide moves forwardly, the roller 16 is adapted to come into engagement with a suitably shaped rotatable cam 17 carried on a shaft 18, supported and journaled in a bracket 19 mounted on the head 11, this shaft being adapted to be rotated at the speed of rotation of the work or workpiece by being connected by suitable gearing 20 with a portion of the chuck holding the workpiece, the latter being indicated at 21. The roller 16 is held in engagement with the rotating cam 17 by a spring 22 surrounding a plunger 23, movable endwise in a barrel-like extension 14$^a$ of the bracket 14, and acting on a lug 15$^c$ carried by the oscillatory support 15.

By an attachment of this kind, which is fully described in my companion application referred to, an irregular surface can be bored or turned on the workpiece, the tool carried by the oscillatory support being moved in and out with reference to the axis of rotation of the workpiece by the rotatable cam, so that a surface of the proper contour or outline will be cut.

Inasmuch as the attachment and its function is fully described in my companion application, further description thereof is unnecessary, and reference will now be had to the tool-holder itself.

The tool-holder as illustrated, includes a bar 24 which may be secured in any suitable way to the part which is designed to support it, the nature of this part depending, of course, upon the type of machine to which the invention is applied, but inasmuch as I have shown my invention applied to a machine having an oscillatory tool-holding support 15, the bar is secured to the member 15. It can be secured thereto in different ways, but in this instance the bar has an enlarged rear portion which is fitted into a boss 15$^d$ in the arm 15$^a$ of member 15, and is securely held therein by a set-screw 25 (see Fig. 2). The roughing tool, which is indicated at 26, is held at the forward end of this bar, and in this instance on a removable portion 24$^a$ thereof, the bar being made in sections, or provided with a removable portion 24$^a$ for convenience of assembling, as will be explained presently. The roughing tool 26, as illustrated in Fig. 7, is secured to the removable portion 24$^a$ of the bar by set-screws 27.

Rotatably supported on the bar 24 and its extension 24$^a$ is a sleeve 28, which has a forward removable portion 28$^a$ carrying the finishing tool 29 which is secured in the forward end of the extension 28$^a$ of sleeve 28 by set-screws 30, as shown in Fig. 6.

The sleeve 28 is held from endwise movement on bar 24 in either direction. It is held from movement toward the enlarged portion of the bar by reason of the fact that the extension 28$^a$ of the sleeve has a closed forward end which bears against the forward end of the extension 24$^a$ of bar 24. The sleeve 28 is held from endwise movement in the opposite direction by reason of the fact that the extension 24$^a$ of the bar is provided with a shoulder 24$^b$, which is engaged by the end of the body portion of sleeve 28, i. e. the threaded end onto which the extension 28$^a$ is screwed.

In assembling these parts, the body portion of the sleeve 28 is applied onto the bar; then the extension or nose 24$^a$ of the bar is screwed into place; and then the extension 28$^a$ of the sleeve is applied and is screwed onto the body portion of the sleeve until the end of the sleeve extension 28$^a$ engages the end of the bar extension 24$^a$, and until the threaded end of the body portion of the sleeve 28$^a$ comes up against the shoulder 24$^b$. By this arrangement the sleeve is held from endwise movement on the bar, but it can be rotated thereon.

When a roughing cut is being taken on the workpiece, the roughing and finishing tools occupy the relative positions shown in Fig. 5, which shows the nose of the roughing tool 26 in position for cutting, and the finishing tool 29 displaced approximately 160° from the roughing tool. The nose of the roughing tool projects through a slot 28$^b$ formed in the extension 28$^a$ of the sleeve, and when the tools are in the relative position shown in Fig. 5, the end 28$^c$ of the slot bears against the under side of the roughing tool 26.

After the roughing cut has been completed during the forward movement of the slide, to bring the finishing tool into cutting relation with the workpiece it is only necessary to turn the sleeve 28 with its extension 28$^a$ and the cutting tool 29 on the bar 24 in the direction indicated by the arrow in Fig. 5, until the opposite end 28$^d$ of the slot 28$^b$ rests upon or engages the top of the roughing tool 26, this position being illustrated in Fig. 7. This brings the finishing tool into the position shown in Figs. 3, 4 and 6, it then occupying a position of alignment with the roughing tool with its nose projecting outwardly slightly beyond the nose of the roughing tool, as indicated in Fig. 4. To thus rotate the sleeve and bring the finishing tool to the position stated, the sleeve is rotated as indicated by the arrow in Fig. 5. Inasmuch as the workpiece is rotated in the same direction, it is obvious that the pressure or thrust due to cutting, transmitted from the workpiece to the tool is in a direction such as to hold the end 28$^d$ of slot 28$^b$ down onto the roughing tool, with the result that the finishing tool is firmly supported, and a smooth finishing cut can be taken without employing any other means for holding or supporting the finishing tool.

The sleeve with the cutting tool may be turned in various ways, but in this instance the rear end of the sleeve is provided with an outwardly projecting handle 31 which, as illustrated, is next to the enlarged portion of the bar 24, which is received in the boss 15$^d$. Additionally I prefer to provide a suitable detent arrangement to hold the sleeve against accidental movement due to vibration. This consists in this instance, of a ball 32, which functions as an ordinary plunger pressed inwardly by a spring 32$^a$, so as to engage in either of two properly positioned depressions or recesses 32$^b$ formed in the bar 24. This detent in practice holds the sleeve 28 in position when a roughing cut is being taken, or when the tools are idle, but as before stated, when the finishing cut is taken, the sleeve is held in its proper position with the sleeve bearing tightly against the roughing tool at the end 28ᵈ of slot 28ᵇ by the pressure of the work on the finishing tool.

When the finishing tool is in its inoperative position as illustrated in Fig. 5, the nose of the tool will always be out of cutting relation with the workpiece, regardless of whether an external surface is being turned, or whether an internal surface is being bored, and this is true, whether the internal surface is annular or oval shaped, for as indicated in Fig. 5, the axis of the toolholding bar 24, indicated as CT is laterally displaced from the axis of the workpiece, indicated CW, so that the tool-holding bar has in effect an eccentric position with respect to the hole being bored.

In operation, to cause the roughing cut to be taken, the operator first having rotated the sleeve 28 with the finishing tool 29 in the direction indicated by the arrow in Figs. 4 and 8 until it reaches the position shown in Fig. 5, throws in the feed, which moves the turret slide forwardly; the finishing tool, its supporting sleeve and the handle 31 then being in the position indicated in Fig. 5. When the roughing cut is completed, the forward movement of the slide is stopped, usually automatically. Then the operator turns the sleeve by swinging the handle from the position shown in Fig. 5 to the positions shown in Figs. 3, 4 and 8, moving the same in the direction indicated by the arrow in Fig. 5. Then the feeding motion of the side is reversed, and on the reverse stroke thereof the finishing cut is taken. Thus there is no idle movement of the turret slide as cutting operations are performed during both the forward and reverse strokes. Additionally there is no necessity of indexing the turret and separate tool-holding brackets for the roughing and finishing tools are unnecessary. This effects a saving of parts and also time in the set-up of the machine, but what is more important, the machine can be operated at very high efficiency, since idle strokes of the slide are eliminated, and both strokes employed for cutting.

It is, of course, obvious that I may, if desired, employ two or more roughing tools arranged side by side, all functioning in a similar manner, instead of a single roughing tool. Furthermore, the tools which are mounted in my improved holder need not of necessity be roughing and finishing tools, but one may be a turning or boring tool carried by the bar, and the other carried by the sleeve may be a back-facing or back-chamfering tool, or possibly other combinations of tools may be employed in my holder, and finally I wish to repeat that my improved tool-holder may be employed advantageously in other types of machines than a turret lathe, and when employed in a turret lathe it need not be associated with an oscillatory holder or an attachment such as illustrated for turning or boring a surface which is not round in cross-section.

I therefore aim in my claims to cover all modifications which do not involve a departure from the spirit and scope of my invention as defined in the appended claims.

Having described my invention, I claim:

1. In combination, two coaxial tool-supporting members, one surrounding the other and each having a tool supported thereon independently of the other member, and means for moving one of said members so as to bring the tool carried by it to and from cutting position.

2. In combination, a tool-supporting member having a tool a second tool supporting member in the form of a sleeve on said first named member and also having a tool, said sleeve being movably mounted so that the tool carried by it may be brought to and from cutting position, each of said members supporting its tool independently of the other member.

3. In combination, a fixed tool-supporting member having a tool a second tool supporting member in the form of, a sleeve surrounding said first named member and also having a tool, and means for rotating said sleeve so as to move its tool to and from cutting position, each of said members supporting its tool independently of the other member.

4. In combination, a fixed tool-supporting member, a second tool supporting member in the form of a sleeve mounted thereon, a tool carried by said first member and projecting through the sleeve, and a tool carried by the sleeve, each of said members supporting its tool independently of the other member.

5. In combination, a fixed tool-supporting member having a tool, and a second tool supporting member in the form of a sleeve rotatably mounted on said first named member and carrying a tool, said sleeve being provided with a slot through which the first-mentioned tool projects, each of said members supporting its tool independently of the other member.

6. In combination, a fixed tool-supporting member provided with a cutting tool, a sleeve rotatably mounted on said member and provided with a cutting tool, said sleeve adapted to be moved so as to bring the tool to and from cutting position, and means whereby the thrust created by the cutting operation is transmitted from the sleeve to said fixed tool-supporting member.

7. In combination, a tool-supporting member having a laterally projecting tool near the end thereof, a sleeve having a slot through which the said tool projects and provided beyond the end of said tool-supporting member with a tool, and means for rotating said sleeve so as to move the tool carried by it to and from cutting position.

8. In combination, a fixed tool-supporting member having a tool, a sleeve rotatably mounted on said member and having a tool, means whereby the sleeve may be rotated in one direction to bring one tool to cutting position and in the opposite direction to position the other tool for cutting, and means for retaining the sleeve in either of its two positions.

9. In combination, a fixed tool-supporting member having a tool, a sleeve rotatably mounted with respect to the axis of said member and having a tool, means whereby the fixed tool-supporting member resists the tendency of the sleeve to rotate when its tool is cutting, and separate means for preventing rotation of the sleeve when either tool is in cutting position.

10. A tool-supporting assembly for metal working machines comprising a fixed tool-supporting member having a cutting-tool, and a sleeve rotatable thereon and having a cutting-tool, the fixed tool-supporting member and the sleeve having engaging shoulders whereby endwise movement of the sleeve in either direction is prevented.

11. A tool-supporting assembly for use on metal working machines comprising a fixed tool-supporting member having a cutting-tool, and a sleeve rotatable thereon and provided with a cutting-tool, both the fixed tool-supporting member and the sleeve being formed in section so as to provide shoulders for preventing endwise movement of the sleeve.

12. A tool-supporting assembly for use on metal working machines comprising a fixed tool-supporting member having a tool, said member comprising a main portion and a removable end portion having threaded engagement, and a sleeve rotatable on both portions of the fixed tool-supporting member and comprising two portions having threaded engagement.

13. A tool-supporting assembly for use on metal working machines comprising a fixed tool-supporting member having a tool, said member comprising a main portion and a removable end portion having threaded engagement, and a sleeve rotatable on both portions of the fixed tool-supporting member and comprising two portions having threaded engagement, the end portion of the fixed tool-supporting member having shoulders adapted to be engaged by co-operating shoulders of both portions of the sleeve to prevent endwise movement of the latter.

In testimony whereof, I hereunto affix my signature.

JOHN J. N. VAN HAMERSVELD.